Jan. 30, 1973  A. SOBEL  3,714,374
IMAGE-DISPLAY PANEL WITH BREAKDOWN-SWITCH ADDRESSING
Filed April 21, 1971  5 Sheets-Sheet 1
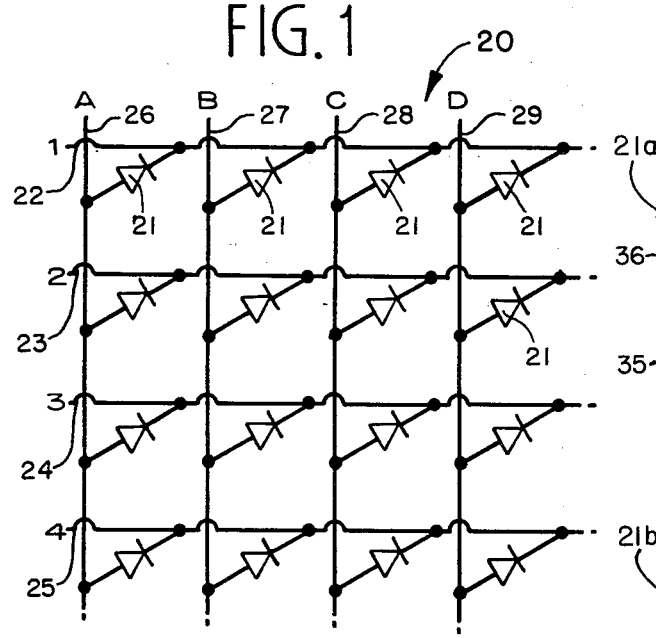
FIG. 1
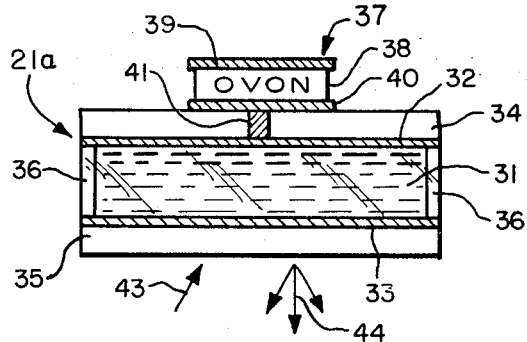
FIG. 2a
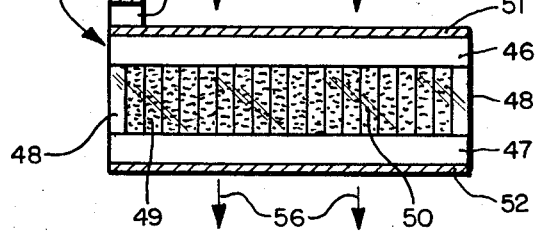
FIG. 2b
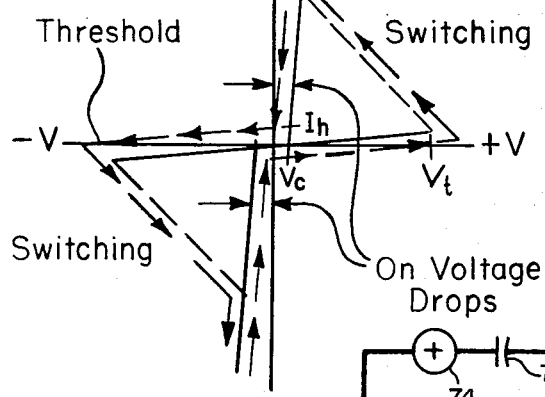
FIG. 2c
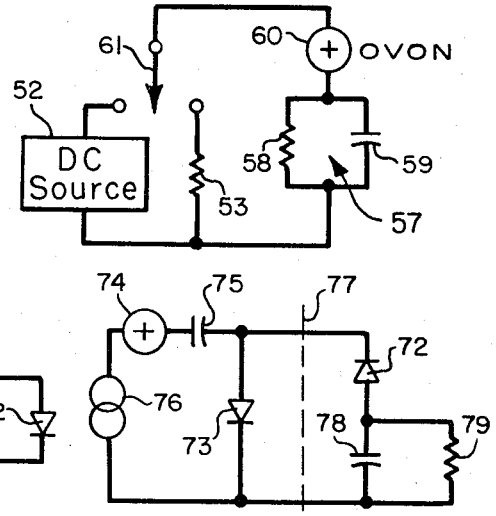
FIG. 3
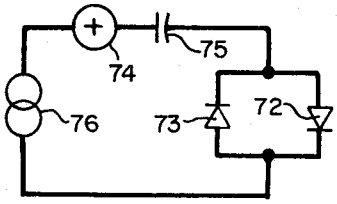
FIG. 4b
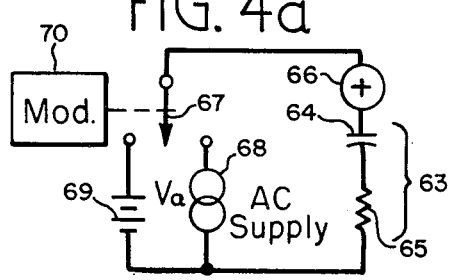
FIG. 4a
FIG. 4c
Inventor
Alan Sobel
By
Attorney

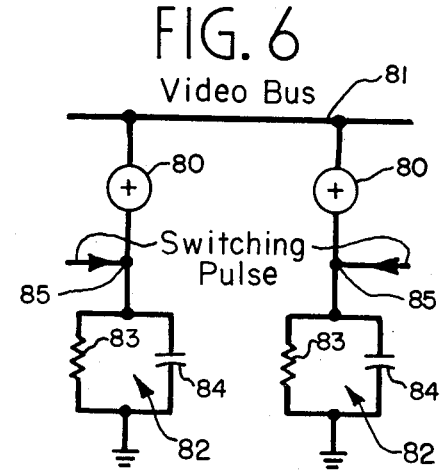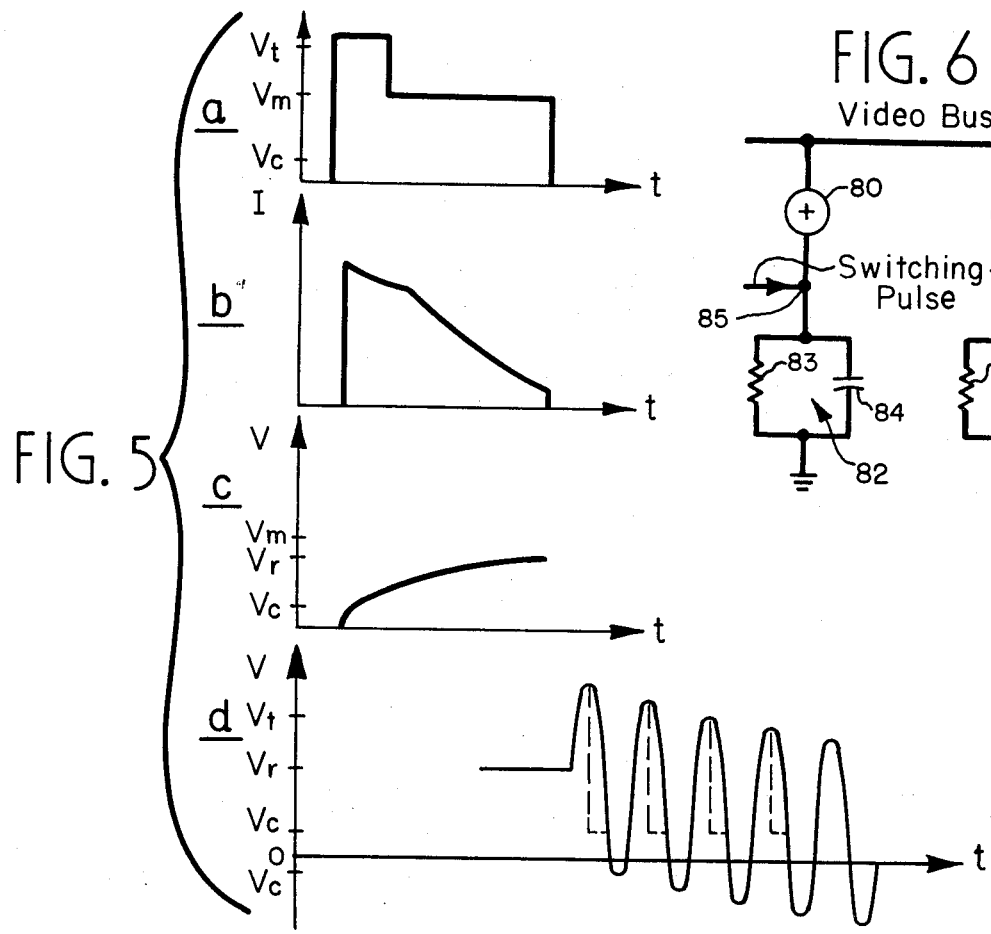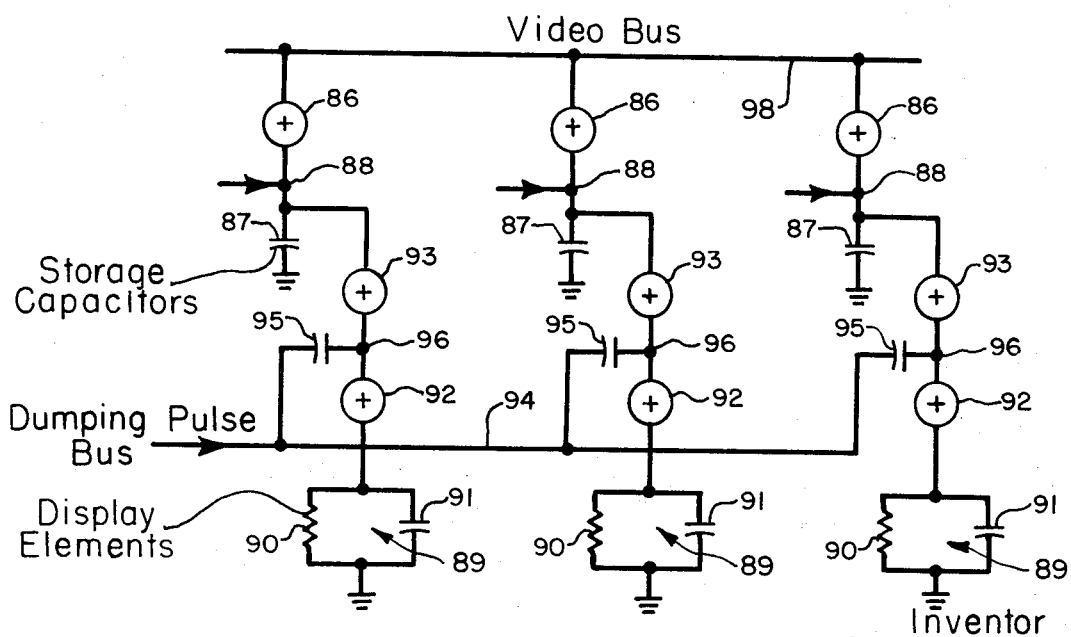

Inventor
Alan Sobel
Attorney

# United States Patent Office 3,714,374
Patented Jan. 30, 1973

3,714,374
IMAGE-DISPLAY PANEL WITH BREAKDOWN-
SWITCH ADDRESSING
Alan Sobel, Evanston, Ill., assignor to Zenith Radio
Corporation, Chicago, Ill.
Filed Apr. 21, 1971, Ser. No. 135,954
Int. Cl. H04n 3/14
U.S. Cl. 178—7.3 D
26 Claims

ABSTRACT OF THE DISCLOSURE

A plurality of display elements, such as light generators or modulators, are distributed throughout an image display panel in horizontal rows and vertical columns. Each element is capacitive and displays light of an intensity proportional to its level of energization. A like plurality of breakdown-type switches are connected individually in series with the respective elements, each switch assuming a conductive or low-impedance condition in response to a control potential exceeding a firing level and assuming a non-conductive or high-impedance condition when the applied voltage falls below a predetermined lower level. The combination of each switch and the capacitance of its associated display elements exhibits a bistable switching characteristic. In response to column-selection signals, different columns are selectively addressed with pulses exceeding the firing level. The different columns are also addressed after firing with individual modulating pulses whose amplitude represents the picture information. At the same time, row-selection signals selectively address different rows of the switches and display elements in order to complete respective return circuits for the firing and modulating pulses. Various scanning circuits and systems, all employing breakdown switches of a type amenable to integration with the display panel, are also described.

---

The present invention pertains to flat-panel image displays and associated addressing circuitry.

While cathode-ray tubes are admirably suited to use as image display devices in television systems as well as oscilloscopes and other non-gray-scale devices, they do require an undesirably large mounting space and impose an undesirable restriction on the form factor of the equipment in which they are employed. Some workers have sought to devise cathode-ray tube constructions embodying a rectangular envelope of comparatively narrow depth. Proceeding in a different direction, a great deal of effort has been devoted to attempts to produce a satisfactory flat display panel. Such display panels have included matrices of various devices, including electroluminescent cells, mechanical shutters, electrically or magnetically orientable particles suspended in a medium, radiation-emitting diodes, gas cells and liquid crystals.

A degree of success has indeed been obtained with at least some of these. Flat panel displays have been demonstrated that are capable of producing images of simple outlines such as numbers and even of more detailed pictures that are stationary. However, these displays have been far from satisfactory for application to television signal reproduction.

Most prior solid-state displays have employed a matrix of crossed conductors for selectively actuating the display elements. The application of a potential between a given vertical conductor and a given horizontal conductor results in actuation of a light-display element situated at the crossing of those two conductors. In order to insure against even partial energization of display elements located elsewhere along either of the two conductors, each display element is associated with a selection device that may take the form of a series diode having a non-linear transfer characteristic. A selecting potential biases the diode to approximately the knee of its characteristic and the video modulating voltage raises the applied potential beyond the knee of the curve. Various systems have been employed for addressing or scanning the display-actuating matrix. These include the use of commutators, shift registers, traveling-wave pulses and similar techniques. Again, the degree of success thus far obtained has been substantially less than that required, for example, in the case of displaying conventional television pictures.

It is, accordingly, a general object of the present invention to provide a new and improved image-display panel that offers advantages relative to prior panels of the same general nature.

Another object of the present invention is to provide a new and improved image-display panel in which picture element selection is achieved in a manner fully coordinated with picture element modulation, with the same components within the panel serving both functions.

A further object of the present invention is to provide advantageous peripheral addressing circuitry for use with such a panel.

A related object of the present invention is to provide new and improved systems for controlling the amount of charge applied to a capacitive element in a network.

An image-display panel in accordance with the present invention includes a plurality of light-display elements distributed in a matrix defining horizontal rows and vertical columns of the elements. Each of the elements includes an energy-storage component and displays light of an intensity proportional to its level of energization. A corresponding plurality of breakdown-type switches are respectively coupled in series with the elements, each of the switches having one of its terminals coupled to the energy-storage component of its associated light-display element. Moreover, each switch is normally non-conductive, becoming conductive in response to an applied firing potential exceeding a predetermined level and returning to a non-conductive state (with impedance much greater than that of its conductive state) when the applied potential drops below a predetermined lower level. Also included are means for supplying a video signal composed of intervals of picture information together with row- and column-selection signals. Means responsive to the column-selection signals are provided for selectively addressing different columns of the switches with firing pulses that exceed the predetermined level when present in conjunction with a row-selection voltage. Means responsive to the video signal are provided for addressing the different columns with respective modulating pulses of an energy level greater than the aforesaid lower level and proportional to the corresponding amplitude of the picture information. Finally, the panel includes means responsive to the row-selection signals for selectively addressing different rows of the switches and display elements in order to establish the selected rows as return circuits for the firing pulses and the modulating pulses.

The features of the present invention which are believed to be novel are set forth with particularity in the appended claims. The invention, together with further objects and advantages thereof, may best be understood by reference to the following description taken in conjunction with the accompanying drawings in the several figures of which like reference numerals identify like elements and in which:

FIG. 1 is a schematic diagram of an image-display matrix;

FIG. 2A is a cross-sectional view of a switch combined with a light-display element for use at each picture-element point in a matrix;

FIG. 2B is a similar cross-sectional view of an alternative type of light-display element;

FIG. 2C is a plot of the current-voltage characteristic of a breakdown switch of the type employed in accordance with the invention for addressing such a display matrix;

FIG. 3 is a schematic diagram of a circuit embodying the invention for addressing a light-display element such as that shown in FIG. 2B;

FIG. 4A is a schematic diagram of another circuit embodying the invention for addressing a display element such as that shown in FIG. 2A;

FIGS 4B and 4C are still further schematic diagrams of circuits embodying the invention for addressing still different types of light-display elements;

FIGS. 5a–5d are plots of voltage and current waveforms associated with a circuit such as that shown in FIG. 4A;

FIG. 6 is a schematic diagram of a portion of the addressing circuitry included with an image-display panel embodying the invention;

FIG. 7 is a schematic diagram of a portion of alternative addressing circuitry embodying the invention;

Figure 8:
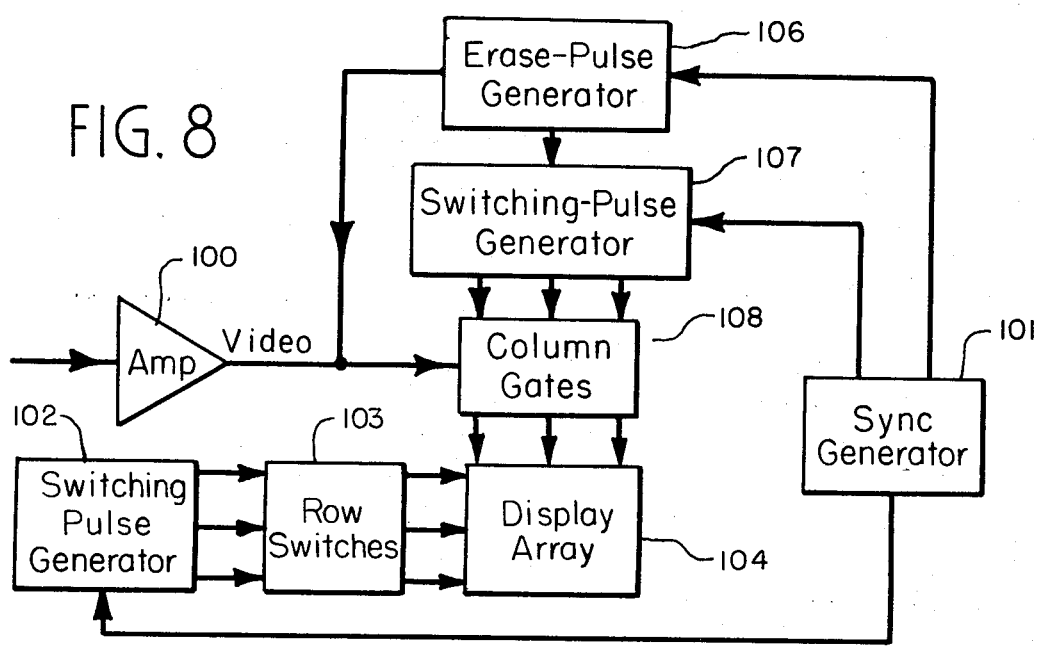
FIG. 8 is a block diagram of an addressing system used in connection with one general class of image-display panels including elements and circuitry depicted in the preceding figures.

A fundamental matrix 20 for an image-display panel is illustrated in FIG. 1. For convenience, each light-display element 21 is represented by a diode symbol. Elements 21 are distributed in a rectangular coordinate pattern of horizontal and vertical columns which may be identified by the corresponding crossed arrays of horizontal and vertical electrical conductors 22–25 and 25–29, respectively. The terminals of each display element 21 are connected between the horizontal and vertical conductors at the cross point at which it is located. In referring to rows and columns herein, such language is to be understood as embracing well-known similar and equivalent image addressing techniques such as the PPI display, in which radial and concentric circles or segments replace the rows and columns.

Without more, matrix 20 could represent a display panel in which each element 21 is a source that emits light when a potential exceeding a certain threshold value is impressed across its terminals. Thus, the display element 21 located at the intersection or crossing of row conductor 22 and column conductor 28 would emit light when a potential of suffcient amplitude is impressed across those two conductors. By leaving one side of the potential source connected to row conductor 22 but commutating the other side of the source sequentially from one vertical conductor to the next, the display elements 21 of a selected horizontal line are successively energized. If the source connection to row conductor 22 is then switched to row conductor 23 and the other source connection again commutated across the vertical conductors, the display elements 21 of a second line are successively energized. In this manner, a conventional television-type image raster may be developed by applying the instantaneous video or picture information to the different vertical conductors as they are scanned or commutated or by applying it to the row conductor, since only one column conductor is energized at a time. Each display element 21 develops a fundamental picture element of the image to be reproduced. In conventional terminology, one complete scanning interval, during which all rows are successively scanned throughout their length, is defined as an image frame. Successive frames may be scanned within sufficiently short time intervals that the eyes of the observer integrate the different frames into a continuous picture capable of reproducing moving images.

In a known approach, each of display elements 21, in itself or by virtue of association with a separate device, exhibits a non-linear response characteristic featuring a pronounced knee. The selecting potential applied between the horizontal and vertical conductors is of a value corresponding approximately to the knee of the characteristic curve. The simultaneous superimposition of the video-represenative control signal raises the energization of the display element above the knee by an amount which is proportional to the instantaneous video level. Correspondingly, the intensity of the light displayed is proportional to the level of energization beyond the threshold value represented by the position of the knee on the response curve. Consequently, each display element has properties which permit both selection and control, the function of selection determining whether a given display element displays any light and the function of control establishing the brightness displayed by the selected element in accordance with the picture content.

Display elements 21 may be any suitable light-generating or light-controlling device. Injection-luminescent diodes, electroluminescent cells, and gas-discharge cells exemplify light producers. Alternatively, the display elements may be either controllably reflective or controllably transmissive devices such as liquid crystals, electrically or magnetically actuated particle light modulators, mechanical shutters or polarization shutters. Some of these different devices operate best under energization by an alternating potential while others are most desirably energized with a unidirectional potential. In any event, the kind of device to be employed in the apparatus hereinafter described is one that displays light with an intensity that is proportional to its level of energization. Also, each of the light display elements includes an associated energy-storage component. With certain types of devices, such as electroluminescent cells and liquid crystals, the display element itself exhibits sufficient capacitance to serve as its own energy-storage device. Where necessary, however, the energy-storage function may be augmented or performed entirely by a separate capacitive element. For the description which follows, it is therefore to be understood that display elements 21 in FIG. 1 both display light and include an energy-storage component which is capacitive in nature.

FIG. 2A depicts a light-display element 21a composed of a nematic liquid crystal material 31 sandwiched between electrodes 32 and 33. Electrode 33 is transparent, while electrode 32 preferably is highly reflective on its surface interfacing with liquid crystal material 31. Electrodes 32 and 33, in turn, are sandwiched between a pair of glass layers 34 and 35. Extending between the electrodes around the edges of liquid crystal material 31 is a spacer 36 formed of plastic or glass.

Adjacent to display element 21a is a solid-state two-terminal breakdown-type switch 37. More particularly, switch 37 may be an ovonic threshold switch composed of a body of amorphous semiconductor material 38 sandwiched between a pair of conductive electrodes 39 and 40 with electrode 40 being affixed to the outer surface of layer 34 and electrically connected to electrode 32 by a conductive neck 41 which passes through an opening in layer 34.

The dielectric properties of liquid crystal material 31 together with layers 34 and 35 and spacers 36 constitute an energy-storage device in the form of a capacitor electrically in parallel with the conductance of liquid crystal material 31. The parallel-connected capacitance and liquid-crystal conductance are connected electrically in series with switch 37, the switch thus having one of its terminals connected directly to the effective capacitor.

In FIG. 2A, display element 21a operates in a reflection mode as a light modulator. When nematic liquid crystal material 31 is energized by applying a unidirectional or alternating field across electrodes 32 and 33, light represented by an arrow 43, approaching the liquid crystal material 31 through transparent electrode 33, is scattered by the crystal so as to be directed backward as indicated by arrows 44. This effect has been termed "dynamic scattering," because scattering centers are produced in the transparent, anisotropic medium of the liquid crystal material due to the disruptive effects of ions in transit. In practice, the liquid crystal material is sandwiched between electrodes spaced apart by about one-half mil. When no electric field is applied, the liquid crystal material is essentially transparent, and the arrangement may be such that light specularly reflected from electrode 32 does not reach the viewer. However, when a potential typically between five and fifty volts is applied across electrodes 32 and 33, the liquid becomes turbulent and scatters light. In that state, the crystal appears white to the viewer. Increasing the voltage results in an increase of brightness so that a grey scale is obtainable. Contrast ratios in excess of 20 to 1 have been obtained. The bulk of the incoming radiation is scattered generally in the direction of incident light travel; consequently, back electrode 32 desirably is highly reflecting so as to redirect that radiation back through the scattering medium in order to maximize the effect. A detailed discussion of liquid crystal theory, device construction and material formulation will be found in an article entitled "Dymatic Scattering: A New Electro-optic Effect in Certain classes of Nematic Liquid Crystals" by George H. Heilmeier et al., which appeared in Proceedings of the IEEE, vol. 56, No. 7, July 1968, pp. 1162–1171, as well as in references cited in the bibliography at the end of that article.

FIG. 2B illustrates a different light display element 21b in the form of a suspended-particle light modulator. A container formed of glass layers 46 and 47 spaced apart by a glass or plastic wall 48 is filled with a liquid or semi-liquid plastic 49 in which are suspended a substantial quantity of minute reflective platelets or needles 50 of conductive material such as aluminum or insulating material such as iron oxide. Layers 46 and 47 are sandwiched between a pair of transparent electrodes 51 and 52. Electrically connected to the external surface of electrode 51 is a breakdown switch 53, and an electrode 54 is affixed to the body of switch 53 in a location spaced from electrode 51. Again, switch 53 may be of amorphous semiconductor kind.

Under the influence of Brownian and thermal motion within liquid 49, particles 50 assume random orientation, and a substantial portion of incident light represented by arrows 55, is either reflected backwardly generally in the direction from which it came or scattered and absorbed within the particle suspension. On the other hand, when an electric field is developed between electrodes 51 and 52, particles 50 orient themselves in line with that field as a result of which a sizeable portion of incoming light 55 is transmitted through the display element and emerges as outgoing light represented by arrows 56. Since the D.C. resistivity of the liquid 49 may be much less than that of glass layers 46 and 47, it is preferable to use A.C. excitation. This allows a higher field to be developed across the liquid. Frequencies from a few hertz to several megahertz may be used.

Accordingly, by selectively applying electrical energization through switch 53, the display element can be made to function as a light shutter. Moreover, the proportion of the incoming light which is permitted to pass through the suspension is a function of the strength of the applied electric field, so that the light-output intensity is proportional to the level of energization. Analogously to display device 21a, the dielectric properties of suspension 49 and layers 46 and 47 together with wall 48 constitute an energy-storage capacitor, and that effective capacitor and the display element are connected in parallel with each other and in series with switch 53.

Light valves composed of suspended particles subjected to the selective action of an applied field are well-known as evidenced by U.S. Letters Patent No. 1,963,496 issued on June 19, 1934 to Edward H. Land. An article pertaining to the preparation of a suspension of plate-like particles is "New Method for Making Magnetic Fields Visible" by Lawrence Suchow, published in the Journal of Applied Physics, vol. 29, No. 2, pp. 223–224, February 1958. Of interest with respect to the preparation of mutually-contiguous pluralities of display elements 20, in the form of individual capsules of suspended magnetic materials with each capsule capable of acting as a light shutter, is an article by Gloria Siring entitled "Microencapsulation," Stanford Research Institute Journal, No. 15, pp. 2–6, June 1967.

Breakdown switches 37 and 53 as here embodied may be of the type known as "ovonic" threshold switches, or simply "ovons," which are described in an article by George Sideris entitled "Transistors Face an Invisible Foe," which appeared in Electronics, pp. 191–195, Sept. 19, 1966. They also are discussed in an article entitled "Amorphous-Semiconductor Switching" by H. K. Henisch which appeared at pp. 30–41 of Scientific American for September 1969. Additional description of such devices will be found in a series of articles beginning at page 56 of Electronics, vol. 43, No. 20, for Sept. 28, 1970. Each ovonic threshold switch throughout the display matrix may be simply a small layer or dot of a glass-like material deposited upon an electrode of the associated light-display element. Differences in material constituents or in thickness permit the ovonic switches to exhibit different threshold levels, the threshold voltage apparently being a function of the energy band-gap structure of the material. In combination with the capacitance of the associated light-display element, the switches exhibit bistability in the sense that, once fired, each switch continues to pass current from a source of A.C. sustaining voltage to the associated display element. Further explanation of the property of bistability of such switches as used in electroluminescent display panels will be found in an article by B. A. Babb entitled "New Switches and Circuits for Control of Electroluminescent Arrays," Proceedings 18th Annual National Aerospace Electronics Conference, Dayton, Ohio, pp. 135–140, May 16, 18, 1966.

Briefly, the characteristics of the ovonic threshold switch or ovon are shown in FIG. 2C. The switch presents a high resistance for applied voltages below a threshold level $V_t$. When the applied voltage across a switch exceeds the threshold level $V_t$, the switch breaks down and conducts at a substantially constant voltage $V_c$; when conducting, the switch exhibits a low impedance. When the current through the switch falls below a holding current threshold $I_h$, the switch reverts to its high-impedance state; this occurs when the voltage across the switch falls below the cut-off level $V_c$. The switching action is independent of the polarity of the applied voltage. Switching to the low-impedance state is very rapid, while switching in the other direction, although slower, is still sufficiently fast for the intended application. While a present preference has been expressed for the use of ovonic threshold switches in the circuitry of the invention, other types of switches with similar characteristics may be substituted for ovons in any of the circuits to be described. For example, thyristors, gas-discharge devices, triacs and various semiconductor-junction devices are known to present characteristics similar to those shown by FIG. 2C.

FIG. 3 illustrates a fundamental single-element circuit for selecting and controlling a display element 57 of the class, such as nematic liquid crystals, that respond to direct current and exhibit a high impedance. That impedance is represented by a resistor 58 in parallel with a capacitor 59 which may constitute the above-discussed capacitance inherent in the display element itself. For such a display element to scatter or otherwise control light, it is necessary that current flow through its resistance 58. Capacitor 59 may store sufficient charge to provide the required current for a substantial fraction of an image frame interval.

In series with display element 57 is an ovonic threshold switch 60, one side of which is connected to a mechanical, electromechanical or electronic selection switch 61. Switch 61 may connect either to a unidirectional potential source 52 or to a resistor 53, both of which are returned to display element 57. The connection of selection switch 61 to source 52 represents the condition of matrix operation wherein display element 57 is selected from among all of the other similar display elements throughout the matrix. When display element 57 is not actuated, it is presented with shunt resistance, represented by resistor 53, arising from leakage paths within the display panel and the peripheral addressing circuitry.

In order to select display element 57, switch 61 is connected to source 52 which produces a firing pulse having an amplitude in excess of threshold voltage $V_t$ so as to effect conduction of ovon 60; the firing delay interval may be decreased by increasing the amount by which the firing pulse amplitude exceeds $V_t$. The firing pulse is immediately followed by the production of a video-representative modulating pulse which charges capacitor 59 to a control level that is greater than $V_c$ but less than $V_t$. On application of the modulating pulse, the capacitor 59 charges until the potential across it approaches the source voltage, and ovon 60 becomes nonconductive when its current flow becomes less than $I_h$. Then, when selection switch 61 is thrown into connection with resistor 53, if the applied modulating potential were greater than the value of $V_t$, ovon 60 would be rendered conductive by the potential stored on capacitor 59 as a result of which capacitor 59 would discharge through resistor 53, undesirably reducing the time during which charge remains stored in the capacitor. Although the value of resistor 53 may be sufficiently high that, in practice, little charge could leak from capacitor 59 through it, even small fluctuations in the potential across capacitor 59 may result in undesired cross-talk effects.

To summarize, selection of display element 57 requires a firing pulse greater than the threshold level $V_t$, while modulation, the determination of the amount of light output, requires a subsequently effective voltage between $V_t$ and the cut-off level $V_c$. It will be observed that this is in contrast to the more conventional arrangement in which a display element has a sharp knee characteristic, but a monotonic output characteristic, as typified by a semiconductor junction diode. With such an arrangement, selection is effected by applying a voltage just equal to the knee of the input-output characteristic while modulation is achieved by simultaneous application of a voltage greater than that knee voltage.

The dischrage time constant of display element 57, that is, the product of resistor 58 and capacitor 59, may well be greater than one frame interval in the matrix environment described in connection with FIG. 1. On the other hand, the charging time constant, which is the product of the capacitance and the charging-circuit resistances, must be less than one picture-element time for point-by-point operation of the matrix. When the discharge time constant is greater than one frame interval, rapid discharge, so as to be ready for addressing during the next frame, may be obtained by constructing source 52 to deliver a reverse-polarity potential pulse prior to the re-addressing of the display element. Because ovon 60 is bi-directional, the reverse-polarity potential fires the ovon and capacitor 59 is then discharged to a negative potential $-V_c$. Subsequent re-selection and charging to the desired sustaining potential can then again be carried out during the next addressing interval. Accordingly, the circuit of FIG. 3 is suitable for an addressing system in which the sequence of operation is first to discharge all display elements in a row by use of a reversed-polarity potential pulse from source 52 and then to charge the individual different capacitors 59, point-by-point, to the desired display potentials. Alternatively, by using an external storage matrix, all of the display-element capacitors 59 in the row may be charged simultaneously (i.e., line-at-a-time addressing) following their initial concurrent discharge. In either case, one alternative is to arrange source 52 so that capacitors 59 are charged with opposite polarities on alternate frames. This makes discharge of the capacitor automatic on the next address cycle, and may be of benefit in connection with certain display elements such as liquid crystals, which suffer less degradation from A.C. than from D.C. operation.

Another approach takes advantage of the fact that, by reversing polarity on a fired switch in a time interval shorter than its recovery time, the switch remains in its low-impedance state but its current reverses direction. After the switch is fired by application of a firing pulse of the same polarity as before, the terminals of the switch-capacitor combination are then rapidly connected to the modulating source which is presumed for a moment to present a voltage which is lower in amplitude but of opposite polarity compared to that during the previous frame. The current through the switch thereupon reverses and the capacitor discharges through the switch to the new, lower voltage. In this arrangement, the firing pulse preferably is coupled into the charging circuit by a capacitor or diode to provide a source impedance higher than that of the rest of the circuit, so as to enable the capacitor to charge or discharge through the switch from or to the lower-voltage, low-impedance modulating source.

With a plurality of display elements 57 and their associated ovonic switches 60 distributed throughout a matrix such as that of FIG. 1, it is, of course, a first requirement that a firing pulse in excess of the threshold level $V_t$ applied across a given pair of crossing row and column electrodes actuate only the display element at that crossing. At the same time, all other display elements in both that row and that column are connected to one side or the other of the driving source as well as being returned to the respective opposite sides of the source through the shunt paths typified by resistor 53 in FIG. 3. In order to insure avoidance of false firing of other than the desired display elements it can be seen that the modulating voltage, applied to the selected display elements following the application of the firing pulse, encounters a limit on its maximum amplitude that is dictated by the shunt parameters present in a given array system. These limitations are discussed in detail in an article by Alan Sobel entitled "Selection Limits on Matrix Displays" appearing in Proc. 1970 IEEE Conference on Display Devices, New York, N.Y., December 1970.

Moreover, it usually will be necessary to use a selection voltage higher than the threshold level $V_t$ in order to accommodate the inevitable spread in the threshold levels of the different switches within the limitations of attainable manufacturing tolerances. It may be noted that such a spread of threshold levels need not result in important local variations of grey scale or in mottling, since the level to which each elemental capacitor 59 is charged is instead essentially a function of the cut-off voltage $V_c$ which is more uniform than the threshold voltage from one breakdown switch to the next. This is an additional advantage of the use of breakdown switches as compared with devices in which variations in the location of a critical knee in the characteristic can have substantial effect upon the action of the control of modulating potential.

Other display elements require excitation by a potential that exhibits an alternating waveform in order to produce or control light. An example of such a device is an electroluminescent phosphor. FIG. 4a depicts a fundamental selection and control circuit for such an element. In this case, a display element 63 is represented by a capacitor 64 in series with a resistor 65 corresponding respectively to the inherent capacitance discussed in connection with FIG. 2B and the internal resistance of the element. Display element 63 is connected in series with an ovon 66, and a selector switch 67 can be actuated to connect either an alternating potential supply 68 or a DC potential source 69 across the series combination. The actuation of switch 67 is controlled by a modulator 70.

In operation, modulator 70 functions first to connect switch 67 to DC source 69 in order to fire ovon 66 and then charge capacitor 64 to a modulating potential value between the threshold voltage $V_t$ and the cut-off voltage $V_c$ of ovon 66. This initial step thus is essentially the same as already discussed for the operation of the direct-current-operated circuit of FIG. 3. FIG. 5a depicts the direct-current potential waveform applied across ovon 66. It begins with a firing pulse having an amplitude exceeding $V_t$. The firing pulse is immediately followed by a control or modulating pulse having an amplitude $V_m$. FIG. 5b exhibits the current through ovon 66. After a short firing delay interval, the current exponentially decreases with the curve having two different segments corresponding to the respective levels of the firing and modulating intervals. FIG. 5c then shows the voltage across capacitor 64. The potential begins to rise when the current starts to flow and reaches the level $V_x$ which at least approaches the value $V_m - V_c$.

The next step is to discharge display capacitor 64 with an alternating voltage of constant peak amplitude lesss than the threshold voltage $V_t$, i.e., peak-to-peak amplitude less than twice $V_t$. To this end, modulator 70 next shifts switch 67 to connect with source 68 that applies an alternating voltage waveform of constant amplitude $V_a$. The alternating voltage thus is superimposed on the capacitor charge level as shown in FIG. 5d wherein the solid line represents the resulting composite waveform across ovon 66 and capacitor 64. On the first cycle of the applied alternating voltage, the threshold potential $V_t$ is exceeded by the initial waveform peak as a result of which ovon 66 conducts until the composite potential swings below $V_c$ toward the reverse polarity waveform peak. The voltage across ovon 66 itself, during its conduction intervals, is indicated by the dashed lines in FIG. 5d. The current through the switch is in a direction opposite that which existed during the DC operation of FIG. 5b. Such conduction intervals continue, as the initially established direct-current component of the charge decays, until the positive-going excursions of the alternating potential fail to exceed the threshold voltage $V_t$.

It will be noted that each succeeding conduction interval is shorter than the one before. Of course, the peak alternating supply voltage must be less than the threshold voltage $V_t$ so that, in the absence of a unidirectional modulating pulse stored in the capacitor, the switch does not fire. The number of cycles of the alternating current delivered to the light-display load represented by resistor 65 is a function of the modulating pulse amplitude and duration, the amplitude and frequency of the alternating voltage and the relative values of capacitor 64 and resistor 65. As represented in FIG. 5d, merely for illustration, discharge of the display capacitance with attendant energization of the AC-operated display element begins with the appearance of the first positive peak of the superimposed alternating waveform and continues until after the fourth positive peak. The "on-time" may be a substantial portion of a frame interval. In any event, the DC portion of the modulating pulse determines the time duration of the AC energization.

It may be noted that the circuits of FIGS. 3 and 4a have a purpose similar to that of fundamental addressing approaches previously associated with gas-plasma display elements. However, the range of modulation, which is a function of the difference between the threshold voltage $V_t$ and the cut-off voltage $V_c$, is typically much larger for the combinations of the disclosed breakdown switches and display elements than for at least the usual gas-discharge display systems. Also, the sequence of voltages described here is novel. In the typical gas-plasma display, a plasma cell is connected in series with a capacitor and the plasma cell serves both as the firing switch and the light producer. In distinction, the arrangements of FIGS. 3 and 4a utilize a switch which is separate from the light producer and in this case the capacitor is a component of the light emitter or controller itself.

While the primary environment to which the present application is directed is that of an image display panel, it will be observed that the basic system approaches of FIGS. 3 and 4a may find utility in the operation of any of a variety of networks in which it is desired to control the charge applied to at least one capacitor included in the network. By way of summary and in this broader context, the initial approach is that of using a control waveform that includes a first large-amplitude pulse that fires a breakdown switch. That first pulse is followed by a lower-amplitude pulse which controls the charge to be deposited on the capacitor. The circuitry to which the control waveform is applied includes at least one such breakdown switch in series with the capacitor. However, the circuitry may be more complicated. For example, the capacitor may be either in shunt or series with other resistive and capacitive networks, and the eventual output device may operate on either alternating or direct current. In any case, the level to which the controlled capacitor may be charged is a function of the energy, the combination of amplitude and duration, in the control pulse. A primary reason for using the waveform sequence of firing pulse followed by control or modulating pulse is to insure that the controlled capacitor is not charged to the breakdown switch firing voltage. Otherwise, the breakdown switch could again be fired on being subsequently connected in parallel with associated networks. Even though the firing pulse desirably is sufficiently large that it causes the breakdown switch to fire rapidly, it may still be of sufficiently short duration that it does not in itself contribute significantly to the ultimate control charge level on the capacitor.

As described above, ovon 66 in FIG. 4a is utilized both to permit passage to capacitor 64 of the direct-current control charge and to permit subsequent energization of capacitor 64 by an alternating energy source. The control charge may be appropriately described as a conditioning charge. It will be apparent that these two functions of switch 66 might be performed by separate elements. That is, a separate breakdown switch (not shown), in parallel with ovon 66, may be provided with its own firing control circuitry to permit passage of the direct current control charge while ovon 66 serves only to conduct the energizing portions of the alternating waveform from source 68. In any event, the approach of FIG. 4a is that of initially placing a control or conditioning charge onto a capacitor connected in the load circuit of a breakdown switch. Upon subsequent application of the alternating waveform, the current level and the number of current pulses conducted to the capacitor during the AC operation are functions of the breakdown-switch parameters, the circuit parameters and the applied potentials. The result is a system for converting a direct-current charge to an alternating- or pulsating-current energization. It is to be noted that the alternating waveform need not be sinusoidal but instead may be of any suitable repeating shape such as a sawtooth or a trapezoid. Again, the load which includes the controlled capacitor may be a network having elements other than the primary RC circuit, a basic requirement being only that the controlled capacitance exhibit an associated time constant sufficiently long to hold the control charge between the end of the DC control pulse and the beginning of the AC firing sequence. The end result is a system in which a breakdown switch with a capacitive load is utilized to control the current, charge and power delivered to the load from an alternating-current source in response to the action of a DC control pulse.

As so far discussed, the energy-storage device associated with the display element or load has been an integral part of the element itself. It is also contemplated to take advantage of the ovonic characteristics in connection with the selection and control of different types of light-display elements. The circuit of FIG. 4b includes a pair of reversely poled light-emitting diodes 72 and 73 connected back-to-back and in series with an ovonic threshold switch 74 and a capacitor 75 across an alternating potential source 76. The combination of switch 74 and capacitor 75 functions in response to the alternating potential in the same manner as described with respect to FIG. 4c. In this case, however, conduction of the alternating current is utilized to energize the light-emitting diodes, each pair of which constitutes a display element in a matrix. Where desired to simplify fabrication of the display panel, one of the reversely connected light-emitting diodes may be replaced by a simple diode rectifier included in the peripheral circuitry. Thus, as shown in FIG. 4c, diode 72 is located externally of the viewing area (as represented by dashed line 77). To conserve the current conducted through peripheral diode 72, it is in this case arranged in the circuit so as to be in series with the filter capacitor 78 in the power supply, represented by a resistor 79, associated with source 76.

Detailed attention thus far has been given to the actuation and control of a single light-display element. Of course, in a complete image display panel, it is necessary to include a system for addressing the many different display elements in order to select and control specific display elements so that they emit light of the desired intensity. Some of the particular types of display elements available, especially those that respond to unidirectional energization, exhibit long persistence in response to a single short energy pulse delivered during a fraction of a frame interval. Nematic liquid crystals fall into that category. Other display devices, such as those comprising alternating-current-operated electroluminescent phosphors, require excitation for essentially all of the time during which they are required to produce light. Consequently, different addressing techniques, or at least appropriate modifications in the characteristics of the addressing signals, are necessary with respect to different kinds of display elements. In addition, the particular arrangement of the addressing system depends on whether random or programmed access is contemplated and whether the elements in a given row are addressed point-by-point or all at the same time. In a point-by-point approach of the television raster type, the addressing system for selecting between the different columns of light display elements basically constitutes a commutator for applying both the firing pulses and the correlated control pulses that represent the video-signal modulation. In the row-by-row approach, a similar commutator is employed initially to distribute the input video information to a bank of storage elements, and at some subsequent time the contents of those storage elements are simultaneously "dumped" into the respective different columns. When it is observed that a typical television display requires approximately 500 display elements in each row and about the same number of rows, and further that a tri-color display panel may require three times that number of display elements, it is evident that the addressing systems themselves may become very complicated. Suggested approaches to the formation of such addressing systems include the use of large-scale monolithic integrated circuits and arrays of thin-film transistors. Comparative simplification may be obtained by utilizing ovonic or other breakdown switches in these peripheral systems as well.

To the foregoing ends, FIG. 6 represents a simple scanning commutator arrangement for addressing the different vertical columns in a television-type matrix. A plurality of breakdown gates 80 are connected between a common bus 81, which carries an incoming video signal representative of picture information, and a like plurality of parallel networks 82 each composed of a resistor 83 and a capacitor 84. The term "gates" is employed here and subsequently in this specification merely to distinguish the system function performed from that of the "switches" associated directly with the display elements. In practice, gates 80 may be ovonic threshold switches like those already discussed. Each of parallel networks 82 is returned to ground so that the video signal is applied in parallel across each series arrangement of a gate 80 and a network 82. With each such series arrangement representing a supply path for video information to a respective different one of the columns of a matrix, the sequential application of firing pulses to gates 80 effects conduction of gates 80 in sequential order. In each stage, the switching pulse may be applied between bus 81 and a terminal 85 located between gate 80 and network 82.

Preferably, the switching pulses are sufficiently short that they do not contribute significantly to the charge delivered to capacitors 84. Each capacitor is charged to the potential on the video bus with a time constant determined by the series resistance in the video supply circuit and the values of the capacitors; this time constant should be much less than the time interval between switching pulses. When the potential across any capacitor 84 reaches a point at which its difference from the potential on bus 81 drops to the ovon cut-off voltage $V_c$, the corresponding ovonic gate 80 is de-actuated. The sequentially-timed switching pulses may be obtained for example, either from a delay line, a shift register, or any other appropriate delivery device.

As in the circuit of FIG. 3, capacitors 84 and resistors 83 constitute the capacitive and resistive impedance components of the light-display elements. They may also be taken to include such non-linear components as the breakdown switch 60 of FIG. 3. Accordingly, the system of FIG. 6 may be employed directly as a means for sequentially firing the light-display elements in a row of a display panel while also supplying the video information carried on bus 81 to a display element during the time interval in which an associated one of ovonic gates 80 is in a conducting state. In that case, it may be desirable to include a further breakdown switch between each terminal 85 and its connected element 82 in order to achieve better isolation between the different display elements. Alternatively, capacitors 84 and resistors 83 may be part of the peripheral circuitry, and the potentials developed across capacitors 84 in response to the sequential firing of ovonic gates 80 may be coupled to the respective vertical conductors in a matrix. With both gates 80 and display elements 82 included within the matrix itself, the switching pulses may be carried by the vertical conductors (26–29 in FIG. 1), while the video signal is separately conveyed throughout the panel by video bus 81. For this purpose, it is preferred to employ as video bus 81 a single conductive film which extends throughout the length and width of the panel and to which all switches 80 are connected.

The addressing system in FIG. 7 includes a similar commutator composed of a plurality of ovonic gates 86 individually connected in series with respectively different capacitors 87 which in this case serve only as energy-storage elements. These different series combinations are returned to ground and are connected in parallel across a video signal source by way of video bus 98. Also as before, switching pulses are sequentially applied between bus 98 and a corresponding plurality of terminals 88 individually located between the respective gates 86 and their associated capacitors 87. Accordingly, the manner of operation of the commutating portion of FIG. 7 involves sequentially firing ovonic gates 86 so that each gate charges its associated storage element 87 to a potential representing the signal level on the bus 98 during the time that the gate remains conductive.

Also included in FIG. 7 are a plurality of display elements 89 each again being composed of a resistor 90 in parallel with a capacitor 91 and each in series with an ovonic threshold switch 92, so that each series combination of a display element 89 and a switch 92 has the same characteristics as the combination of display element 57 and switch 60 of FIG. 3. For simplicity of the drawing, capacitors 87 and display elements 89 are shown as being returned to ground; in the matrix environment wherein FIG. 7 represents a portion of but one row of display elements, that "ground" is the associated row conductor to which the video bus also is returned through the video source.

The energization of display elements 89 in FIG. 7 again requires the same combination of a firing pulse for selection and a control pulse to achieve video-responsive modulation. To that end, each of ovonic switches 92 is connected across its corresponding storage element 87 by an ovonic valve 93. In addition, a dumping pulse is supplied in parallel from a conductor 94 through a plurality of small coupling capacitors 95 to a corresponding plurality of points 96 located individually between respective pairs of switches 92 and 93. It may be noted that reference now has been made to switches 92, valves 93 and gates 86. As explained earlier, this is solely for the purpose of helping to distinguish, both in this description and in the appended claims, between their respective different functions in the addressing system. They all may be ovonic threshold switches having the characteristics displayed in FIG. 2c and may be essentially identical in structure. Since capacitors 95 serve only the purpose of direct-current de-coupling, diodes may be used instead.

As already noted, the switching pulses applied sequentially across gates 86 serve to store energy in capacitors 87 representing the instantaneous picture information corresponding to each different column location in a matrix. Subsequent to such storage throughout an entire row of capacitors 87, the dumping pulse is applied to bus 94 in order to fire all of switches 92 and valves 93 and thereby enable delivery of the energy stored on capacitors 87 to each of the respective display elements 89. As in the case of the other series combinations of DC-operated display elements and ovonic switches discussed above, each display element remains energized and continues to deliver light until its associated capacitor 87 becomes discharged.

It will be apparent that valves 93 could be omitted and the dumping pulses applied through the high impedances of coupling capacitors 95 solely to switches 92 in order to enable delivery of the stored energy to the display elements. However, the illustrated arrangement is preferred in order to insure against spurious firing of switches 92 during the sequential charging of storage elements 87. The maximum video potential stored on any capacitor 87 is significantly smaller than that required to fire the series combination of both a switch 92 and a valve 93. The dumping pulse applied through capacitors 95 needs to be of a magnitude only sufficient to exceed the voltage threshold $V_t$ of the corresponding switches 92. Once a given switch 92 is fired, however, its impedance becomes so low that the stored potential on the associated storage element 87 exceeds the threshold voltage necessary to fire the corresponding valve 93, and the stored energy is then delivered to the respective display element 89.

As discussed above, it may be necessary after each addressing operation that each of the shunt capacitors 84 (FIG. 6) and 87 (FIG. 7) be brought effectively to zero charge before the next addressing cycle unless that is accomplished through associated short discharge time constants. For the commutator arrangement of FIG. 6 or the corresponding portion of FIG. 7, such complete discharge may be readily obtained by reverse-pulsing video bus 98 in the same manner as previously described with respect to the production of a reverse-polarity pulse from DC source 52 in FIG. 3. In order similarly to discharge capacitors 91 in FIG. 7, the reverse-polarity pulse is applied through the series combination of each switch 92, valve 93 and gate 86. Alternatively, a separate bank of ovonic switches may be used for the purpose of clearing all remaining stored charge.

Having considered in detail both the elemental addressing of each individual picture element and the nature of systems for addressing entire rows of elements, it is instructive to consider a few of the practical parameters involved. Each single liquid crystal display element of the kind explained in connection with FIG. 2a may occupy a space about 0.01 inch square and have a thickness of only $5 \times 10^{-4}$ inch. Its dielectric constant is of the order of ten, its capacitance is about 0.5 picofarad and an operating potential of about 20 volts may be assumed. For a picture-element time interval of about 100 nanoseconds, the power required is about $10^{-3}$ watt. With the charging circuit presenting a typical resistance of 10,000 ohms, the instantaneous charging current maximum is 2 milliamperes. These are modest requirements, even when all losses are taken into account.

Turing now to complete systems for addressing image display panels of the foregoing character in both the horizontal and vertical scanning directions, FIG. 8 shows a system suitable for sequentially addressing display elements of a kind which respond to a unidirectional control or modulating potential. An amplifier 100 supplies a video signal composed of successive intervals of picture information, A sync generator 101 supplies synchronizing information in the form of row- and column-selection signals that may be derived from the same composite video signal. The row-selection signals from generator 101 synchronize the action of a switching-pulse generator 102 that actuates a plurality of row switches 103 in order to selectively address different rows of display elements within a display array 104. Switches 103 thereby complete respective return circuits for firiing pulses and modulating pulses that are applied by the column-addressing portion of the system. Column-selection signals from generator 101 are applied both to an erase-pulse generator 106 and a switching-pulse generator 107. Switching-pulse generator 107 creates a sequence of firing pulses that are sequentialy addressed to a plurality of column gates 108 which connect to corresponding different ones of the vertical columns in array 104. Erase-pulse generator 106 feeds reset signals to generator 107 in order to return it to a ready condition after the scanning of each complete row, and generator 106 also delivers erase pulses through column gates 108 to the energy storage devices associated with each of the different light-display elements in the display array.

Display array 104 is composed of a matrix of display elements and associated individual breakdown switches each connected as shown in FIG. 3. Column gates 108 comprise a plurality of ovonic threshold devices connected between video amplifier 100 and the respective vertical conductors. Switching-pulse generator 107 is a conventional shift register which steps its output firing pulse from each successive column gate to the next. During the time interval that each gate is rendered conductive, the video signal from amplifier 100 is fed through that gate to the corresponding ovonic switch and display element within the selected column. Either the firing pulses from generator 107 or the video signal may be used to fire the breakdown switches within the matrix, with the return circuit being established by row switches 103. The column-selection signals from generator 101 synchronize the action of switching-pulse generator 107 to the delivery of the video information while the signal fed to erase-pulse generator 106 insures a complete timing lock between the row-scanning intervals and the erasing operation. The erase pulses themselves in this case take the form of the reversed-polarity pulses discussed above that, when applied through gates 108, serve to remove all remaining charge from the energy-storage capacitors. Of course, the other erase schemes mentioned earlier may be used instead in this and the succeeding systems.

Figure 9:
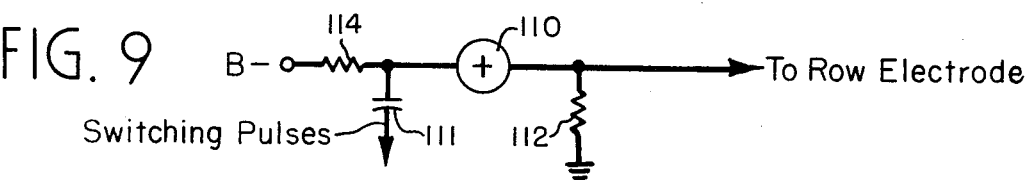
FIG. 9 is a schematic diagram of a portion of the circuitry included in the system of FIG. 8.

Switching pulse generator 102 similarly is a shift register which develops a series of output pulses that are fed sequentially from one row switch to the next. Each row switch must remain conductive once addressed whether or not all the display devices of that row are energized by the video signals. Consequently, the row switches must exhibit a bi-stability so that, once turned on, they remain on until affirmatively de-actuated. A simple arrangement for this purpose is shown in FIG. 9. Each row switch includes an external breakdown gate 110 connected across a direct-current source B—. The switching pulses from generator 102 are applied to one side of gate 110 through a capacitor 111, the other side of gate 110 being connected to the corresponding row conductor of display array 104. Shunted to ground between the output side of gate 110 and ground is a discharge resistor 112. A resistor 114 isolates the switching pulses from the power supply.

In operation, a negative-going pulse from switching pulse generator 102 actuates switch 110 following which its conduction is maintained by connection across DC source B—. A subsequently applied positive pulse de-actuates switch 110. Thus, the different rows are successively returned to ground (through DC source B—) by actuation of the respective row switch circuits. Upon completion of the addressing of a given row through column gates 108, switching pulse generator 102 applies the positive pulse necessary to extinguish the gate 110 at that row shortly before it delivers an actuating negative-polarity pulse to the next succeeding row switch.

In overall operation, then, erase-pulse generator 106 first functions to erase all storage from a row of the storage devices included in array 104. Switching pulse generator 107 sequentially actuates gates 108 so that the video information is written successively into the energy-storage devices within that row of the panel. Finally, the process is shifted to the next row by action of generator 102 and begins anew.

The particular approach of FIG. 8 results in the left-hand or beginning display elements of each line exhibiting greater brightness than those further down the rows, unless the decay time of each display element and its associated energy storage device is sufficiently less than a frame interval so that all storage elements completely discharge at their own rate instead of being erased. When unacceptable, this condition may be overcome by adjusting the video amplitudes in accordance with their positions on the line being addressed. To that end, amplifier 100 may be of the variable-gain variety driven by a ramp signal synchronized with the row-selection signals.

Figure 10:
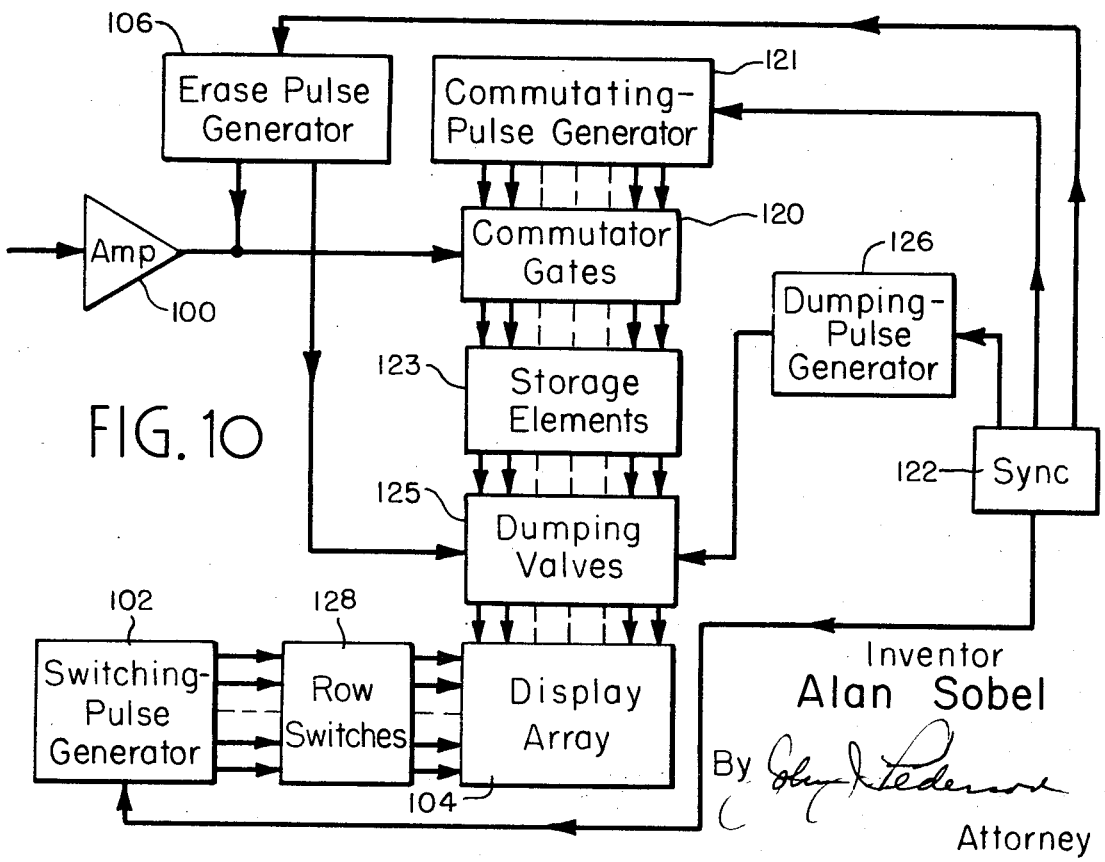
FIGS. 10, 11 and 12 are block diagrams of different addressing systems suitable for use in connection with display-panel arrangements incorporating the basic elements and circuitry of the earlier figures.

For line-at-a-time addressing of the display elements within array 104, the system of FIG. 10 is advantageously employed. In this case, the picture information from amplifier 100 is fed to a plurality of commutator gates 120 sequentially actuated by a commutating-pulse generator 121 which may simply be a shift register cycled by column-selection signals derived from a synchronizer 122. Sync generator 122 also supplies the row-selection signals to switching pulse generator 102. Gates 120 serve to selectively feed the video signal to a plurality of respective storage elements 123 that, in turn, are connected to the corresponding vertical conductors of display array 104 by a like plurality of dumping valves 125. Valves 125 are simultaneously operated by a dumping-pulse generator 126, the operation of which is also timed by synchronizer 122. When necessary, erase-pulse generator 106 may deliver reverse-polarity pulses to discharge storage elements 123 through gates 120 while at the same time discharging the energy-storage devices directly associated with the display elements in array 104 by feeding the erase pulses through valves 125.

More particularly, the combination of commutator gates 120, storage elements 123 and dumping valves 125 is a system like that in FIG. 7. That is, the commutator gates correspond to gates 86, the storage elements are capacitors 87 and the dumping valves are ovonic valves 93 of FIG. 7. Ovonic switches 92 and display elements 89 represent the components located at each crossing of the horizontal and vertical conductors within array 104. The commutating pulses are applied to points 88 while the dumping pulses are applied to points 96. In this case, the erase pulses are applied to points 96 as well as to video bus 98 of that same figure. In overall operation, the order of events is first to erase the charge from both storage elements 123 and the energy storage devices within a given row. Subsequently, commutator gates 120 are sequentially actuated in order to write the video information across the bank of storage elements. After the entire row has been written, pulse generator 126 serves to dump the entire stored contents into the row of energy-storage devices within the display array 104 itself. Finally, generator 102 acts to switch the entire process to the next row following which the storing and subsequent dumping sequence is repeated. Because the energization of all display elements occurs simultaneously throughout a given row, row switches 128 need conduct only for the dumping time interval. Consequently, the row-switch arrangement may be a simple plurality of ovonic gates that sequentially connect the successive row conductors, and the slightly more complex arrangement of FIG. 9 need not be included.

In order to achieve point-by-point addressing of display elements that respond to a potential exhibiting an alternating waveform, the system of FIG. 11 includes a display array 130 the individual picture elements of which correspond to the switching and fundamental operating arrangement described in connection with FIG. 4a. Since selection still is achieved by use of a unidirectional firing pulse, the peripheral addressing elements are essentially the same as in FIG. 8. In the usual case of the alternating-current light-display element, the alternating potential must continue to be supplied for at least a substantial portion of a frame interval. Consequently, the system of FIG. 11 includes an alternating current supply 131 which generates the alternating waveform. The AC supply may be at a frequency as low as the line frequency (15,350 Hz.), so that one cycle is delivered during each retrace time, for example, or it may be as high as the element rate (4.5 mHz. for TV). It will probably be somewhere between these, depending on the output device and the attainable time constants.

Gates 109 must provide the alternating-current supply to all the columns except the one which is being addressed (and perhaps a few columns ahead of and behind this column to allow for the time required for the gates to operate). Accordingly, each gate in block 109 comprises a double-throw switch, which connects its column electrode either to the AC supply or to the video bus and switching-pulse generator. Similarly, the row switches 132 are double-throw switches, connecting each row electrode either to the return for the firing and modulating pulses (through an additional pulse source, if desired, to divide the firing-pulse amplitude between row and column drivers) or to the return for the AC supply. It is convenient to synchronize the AC supply with the various switching operations so that they occur in fixed time relation with the AC waveform.

As before, erase-pulse generator 106 serves both to erase the energy storage devices within array 130 by way of gates 108 and also to reset switching pulse generator 107. Alternatively, the system may be designed so that even for maximum output the storage elements of array 130, corresponding to capacitors 64 of FIG. 4a, for example, are completely discharged in less than one frame. Then erasing of these storage capacitors is unnecessary, and it is only necessary that erase-pulse generator 106 reset switching-pulse generator 107. Both generators 106 and 107 are governed by column-selection signals from synchronizer 133 which also feeds row selection signals to switching pulse generator 102.

Figure 11:
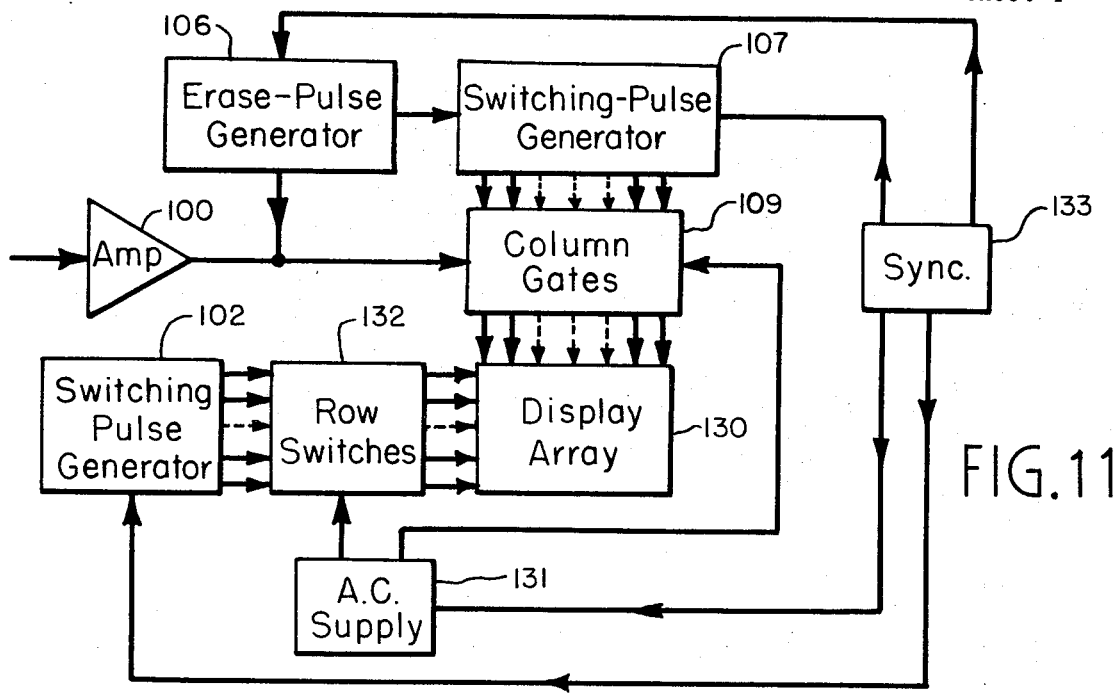

Thus, the event sequence in FIG. 11 is that of first disconnecting alternating-current supply 131 from a given row by action of a row switch 132. Erase-pulse generator 106 then acts through gates 109 to erase any charge remaining on the energy-storage devices within array 130 associated with that row, if the design is such that erasure is required. The individual energy storage devices along the row are then addressed with the video signal in the same manner as in FIG. 8. After each element is addressed, its column gate 109 is actuated to reconnect the column to AC supply 131. Finally, the appropriate switch 132 is actuated to complete the alternating-current return for that row following which the next successive switch 132 is actuated to permit the same sequence to be performed on the next row. Thus the AC supply is fed to all rows except the one being addressed.

Figure 12:
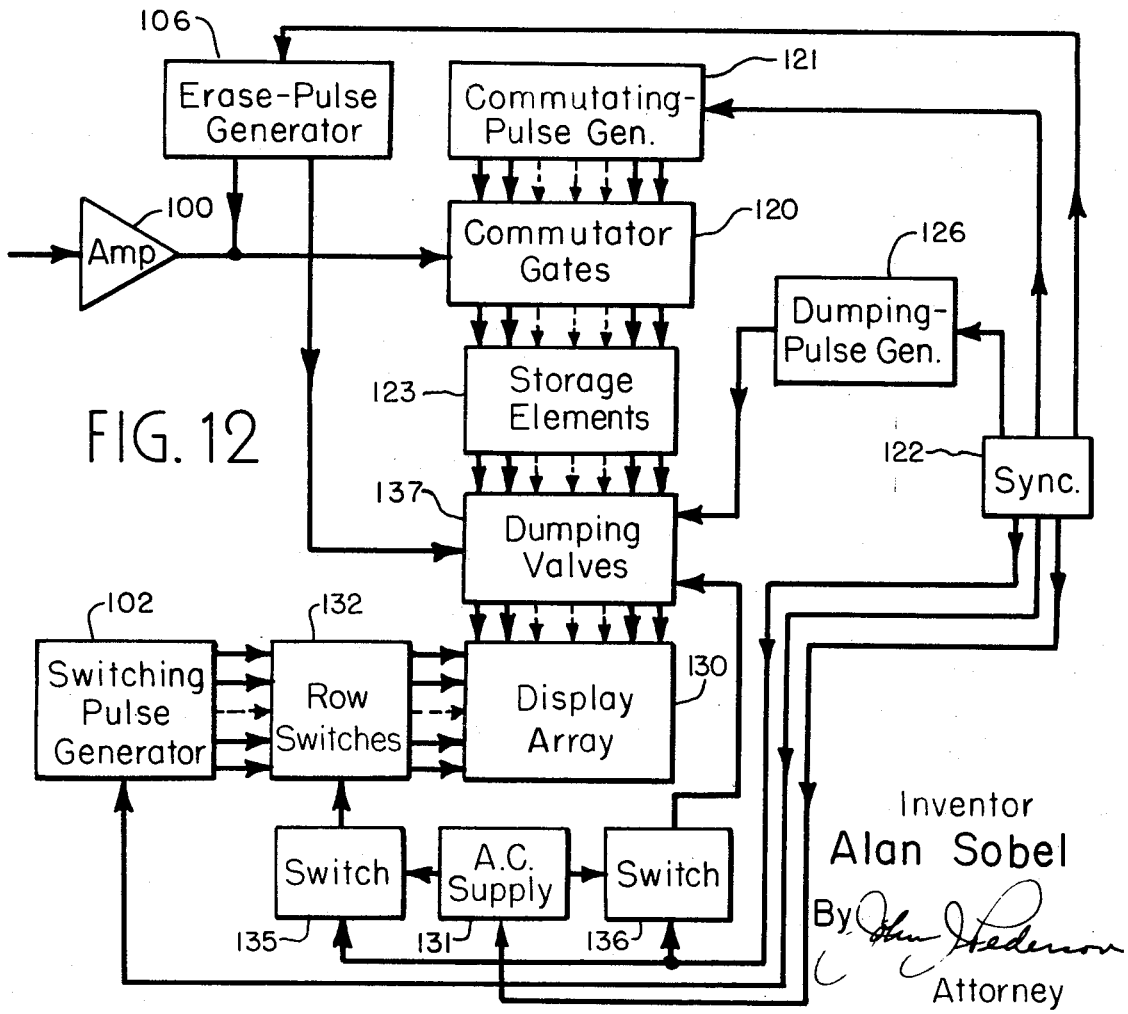

For the purpose of addressing an entire row at a time, an array in which the individual display elements respond to an alternating potential, the system of FIG. 12 can be used. The nature and operation of the different components in the column selection circuitry is essentially the same as already described with reference to FIG. 10. Row switches 132 are again of a double-throw nature so as first to establish a direct-current return circuit and then complete a connection to the alternating-current circuitry. Dumping valves 137 are also double-throw switches. They connect the alternating current supply 131 to the elements of the display array 130 via switch 136, or connect the column electrodes of the display to the storage elements 123, to allow the storage elements to impress the desired control charge on the appropriate display elements.

In operation of the system in FIG. 12, the sequence of events is first to write the video information, in the form of unidirectional pulses of amplitudes which are proportional to the instantaneous video signal, sequentially into storage elements 123 by action of commutator gates 120 under a step sequence governed by commutating-pulse generator 121. During this time alternating current is supplied to all elements of array 130. Subsequently, a row switch corresponding to the selected row is actuated by generator 102 at the same time as switches 135 and 136 are de-actuated in order to remove the alternating potential and complete the direct-current return circuit for that row. Dumping valves 137 are then actuated to disconnect the column electrodes from the AC supply and connect them to the storage elements. The valves are fired to transfer charges from the storage elements to the display elements. If required by the system design, an erase pulse can be supplied from erase-pulse generator 106 to all elements of the selected row prior to dumping the new signal charges into the display elements. This requires a different design for dumping valves 137. In most cases, this type of design will not be used; even a display element which is producing maximum output will be completely discharged by the end of a frame. Subsequently, erase-pulse generator 106 acts by way of gates 120 to erase any remaining charge in storage elements 123. Finally, switches 135 and 136 are rendered conductive in order to reapply the alternating potential to the entire array. It is convenient to synchronize the AC supply with these operations. It can be seen that elements of the display are addressed, a row at a time, during the retrace interval of the video signal, while they are energized by the AC supply during the trace time. This makes possible a duty factor of the order of 80%, for U.S. broadcast TV standards.

Alternate arrangements are possible for applying AC to all elements of the display except those being addressed; these can increase the duty factor to almost unity. For example, the row-addressing portion of the system may be simplified by supplying the alternating potential between all electrodes by way of individual row and column series capacitors that present a high impedance to the writing, firing and erase pulses. With such a construction, only a simple sequencing switch is needed for the purpose of applying the alternating potential to the elements of each row in turn.

As an alternative to the use of shift registers or similar step-type devices as scanning or switching pulse generators, voltage pulses generated by sonic or ultrasonic waves traveling in a solid material may be employed. Such waves traveling in a piezoelectric ceramic material have been known to develop output pulses having amplitudes as high as 600 volts. Such pulses may be derived from the traveling-wave medium by means of pick-up electrodes spaced successively therealong, and may be employed to energize sequentially a plurality of breakdown switches such as those employed in column gates 108 (FIG. 8 or FIG. 11) or commutator gates 120 (FIG. 10 or FIG. 12). Even though such voltage pulses may possibly be subject to a degree of fluctuation in amplitude, reliable operation may be achieved by utilizing the firing principles employed in connection with application of the dumping pulses to initiate conduction of switches 92 and valves 93 in FIG. 7. More specifically, the circuit of FIG. 13 includes a pair of ovonic threshold switches 140 and 141 connected in series between a source of voltage V and ground. The applied voltage is insufficient to fire the series combination of the two switches. However, a trigger pulse of lesser value T applied to the junction between the switches does exceed the threshold voltage $V_t$ of one of the switches so as to fire that switch. When the first switch fires, the other switch will be concurrently actuated, assuming that the overall potential V exceeds the threshold potential of that other switch. In this way, the potential of any trigger pulse may vary over a substantial range and yet serve to effect firing of the series combination so as to supply the more stabilized potential V to an associated light-display load.

Figure 13:
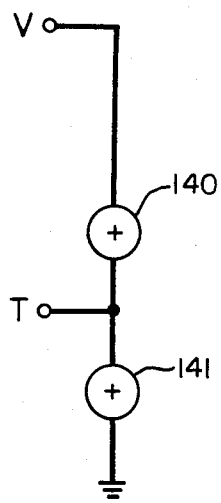
FIGS. 13, 14 and 15 are schematic diagrams of circuitry advantageously included in the aforementioned addressing systems.
Figure 14:
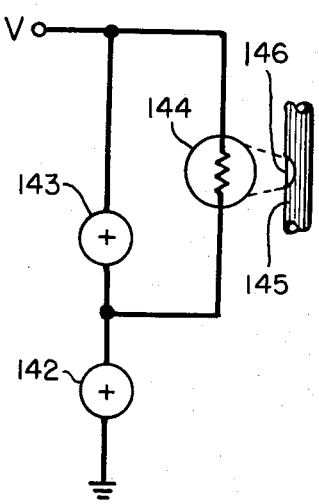

FIG. 13 also serves conveniently to introduce an alternative manner of controlling actuation of the display elements in the different systems hereinbefore described. In FIG. 14, a pair of ovonic threshold switches 142 and 143 are connected in series between a source of potential V and ground. In shunt with switch 143 is a photoconductive element 144 which responds to incident light or other radiation by lowering its shunt resistance and thereby creating at least a partial short circuit across switch 143. Again assuming that potential V exceeds the threshold voltage $V_t$ of switch 142, the resistance of element 144 may thus be lowered sufficiently that switch 142 is actuated by the applied voltage. That occurrence enables actuation of swtich 143 by the same applied voltage.

Accordingly, pairs of switches 142 and 143 may be substituted for switches 92 and valves 93 in FIG. 7 so that the dumping signals are applied in the form of light pulses irradiating associated photoconductors. Analogously, a photo-voltaic device may be substituted for the photoconductor in which case it responds to incident radiation by developing a trigger pulse that fires a series combination of switches in the same manner as described in connection with FIG. 13. Still further, light-operated ovonic switches may be substituted for voltage-actuated ovonic switches in the previously described systems. In consequence, all or part of the addressing may be accomplished by the use of light pulses instead of electrical pulses. Illustrative systems for applying and utilizing light pulses in the addressing of an image display panel are disclosed in the copending application of Joseph Markin and Alan Sobel, Ser. No. 100,240, filed Dec. 21, 1970. In such systems, the light is transmitted through fiber optic elements or light pipes that are substituted for one or both of the horizontal and vertical electrical conductors described in connection with FIG. 1. The light is caused to exit through apertures in the cladding of the fiber optic elements associated with the different light-display elements throughout the matrix. Correspondingly, FIG. 14 includes a fiber optic element or light pipe 145 having a localized cladding aperture 146 through which light may emerge to irradiate element 144.

Figure 15:
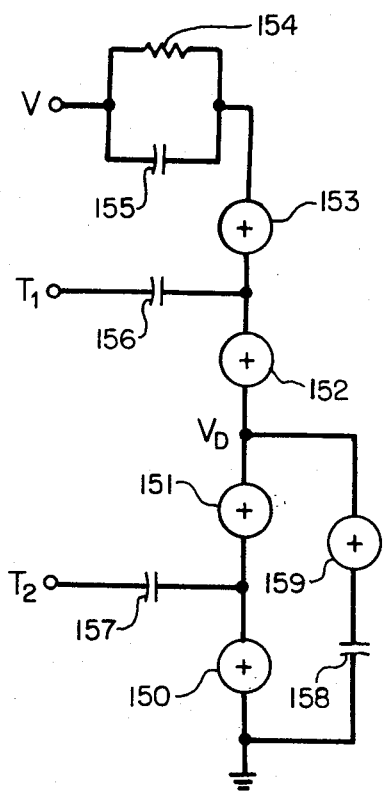

In general, breakdown-type switches of the kind contemplated herein typically may be more accurately timed on actuation than on de-actuation, and they tend to de-actuate more slowly. In the described systems, it may be desired to achieve both fast actuation and de-actuation of the switch functions performed by ovonic devices. FIG. 15 illustrates an arrangement suitable to the achievement of those ends and which may be substituted for the switching circuitry illustrated in the above systems. In this instance, a total of four ovonic threshold switches 150, 151, 152 and 153 are connected in series, and the series combination is coupled in turn between ground and a source of potential V by the parallel combination of a resistor 154 and a capacitor 155. A trigger pulse $T_1$ is coupled to the junction between switches 152 and 153 through a capacitor 156, while a second trigger pulse $T_2$ is coupled to the junction between switches 150 and 151 through a capacitor 157. Finally, the energy-storage capacitor 158 of a display element is connected in series with its directly associated ovonic threshold switch 159, and this latter series combination is connected across series-connected ovonic switches 150 and 151.

Switches 150 and 151 together respond to trigger pulse $T_2$ in the same manner as described in connection with the operation of FIG. 13. That is, the circuit is not fired in response to the existence of a potential $V_0$ impressed thereacross. Pulse $T_2$ is of sufficient amplitude to exceed the threshold voltage of either of switches 150 or 151, so that both switches are actuated. Similarly, the potential impressed across the series combination of switches 152 and 153 is insufficient in itself to fire those two switches, but the application of trigger pulse $T_1$ directly fires one of those switches so as to effectuate automatic actuation of the other.

In overall operation, an enabling potential V is applied across the entire series circuit comprising switches 150-153. Application of trigger pulse $T_1$ then serves to effect the firing of both switches 152 and 153 as the result of which the applied potential is impressed across display element 158 and switch 159 whereupon the latter is fired to conduct energizing current through the display element. Subsequently, energization of the display element is rapidly terminated upon the delivery of trigger pulse $T_2$ which effects the firing of both switches 150 and 151. This short-circuits the display element so as to discharge abruptly its included capacitor and thus extinguish the light display. This requires that the voltage on capacitor 138 aided by the potential $V_D$, be greater than the sum of the firing voltages at switches 151 and 159. All of the switches subsequently may be restored to their non-conductive condtion by interrupting the supply potential V.

Figure 16:
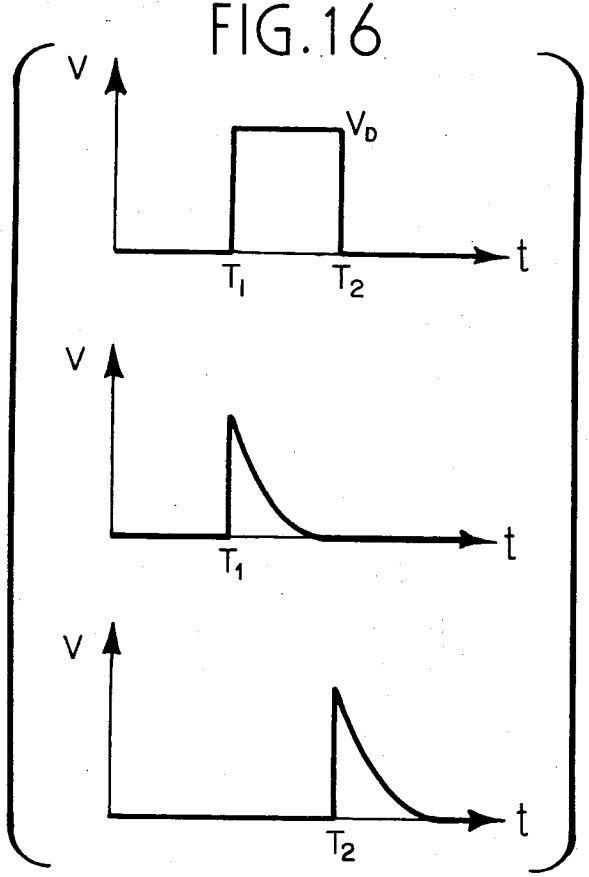
FIG. 16 contains plots of different voltage waveforms associated with the circuit of FIG. 15.

In designing the system of FIG. 15, the impedance of display element 158 is selected to be small compared to the non-conductive impedance of switches 150 and 151. Consequently, the operating voltage applied to display element 158 has the shape depicted in the upper curve of FIG. 16 which features sharp trailing and leading edges corresponding respectively to the leading edges of trigger pulses $T_1$ and $T_2$ as represented respectively in the middle and lower curves of that figure. Since only the leading edges of the trigger pulses are significant, sophisticated shaping circuits are unnecessary for those pulses.

The system of FIG. 15 as thus far described may be utilized for the application of either alternating or unidirectional energizing potential. In the case of an alternating potential, however, the timing of the trigger pulses must be properly phased with respect to the supply voltage and, in that case, the pulses exhibited in FIG. 16 will be understood to represent occurrences within a single half cycle. Also as so far discussed, resistor 154 and capacitor 155 have not been considered. Absent those components, it becomes necessary to interrupt the supply voltage in order to return switches 150-153 to their non-conductive condition following each sequence of operation. The inclusion of resistor 154 and capacitor 155 obviates the need for that external interruption in the case of unidirectional potential operation of the system. The result is effectively to limit the amount of energy available from the supply source in a given cycle so that, after trigger pulse $T_2$ has been applied to de-actuate the display element, the energy in the supply, that is, in capacitor 155, is exhausted. All switches then open and the circuit itself is ready for the next repeat operation. Capacitor 155 serves this function by first discharging while everything is de-actuated and then charging during subsequent operation of switch pairs 152-153 and 150-151, reducing the potential at the junction of elements 153, 154, and 155 to a level below the cut-off voltage for the four switches 150-153 in the series. Resistor 154 serves to discharge capacitor 155 after the display cycle is completed. Thus, the time constant of resistor 154 and capacitor 155 is significantly greater than the time duration of the light-producing pulse illustrated in the upper curve of FIG. 16, but at the same time that time constant is substantially less than the interval between such pulses.

The many different switching, valving or gating systems described all take advantage of the attributes of breakdown switches in order accurately and efficiently to control the addressing and energization of the light-display elements within an image reproducing panel. In practice, ovonic devices can be readily made in thin film form and consequently, they lend themselves admirably to use both within the display panel itself and also in its peripheral circuitry. They also are compatible with the use of present-day solid-state technology in the fabrication of the entire panel as well as the related systems. At each image display element within the panel, a single switch serves both to establish selection of its associated light display element and to admit the actuating or control potential to that display element. Moreover, the different systems described permit the employment of a large variety of different kinds of light-display elements.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:
1. An image-display panel comprising:
   a plurality of light-display elements distributed in a matrix of rows and columns, each of said elements including an energy-storage component and each displaying light of an intensity proportional to its level of energization;
   a corresponding plurality of breakdown-type switches respectively coupled in series with said elements, each of said switches having one of its terminal coupled to the energy storage component of its associated light-display element and each being normally non-conductive, becoming conductive in response to an applied firing potential exceeding a predetermined threshold level and returning to a non-conductive state when the applied potential drops below a predetermined level lower than said predetermined threshold level;
   means for supplying a video signal composed of intervals of picture information together with row- and column-selection signals;
   means responsive to said column-selection signals for selectively addressing different column of said switches with firing pulses exceeding said predetermined threshold level when present in conjunction with a row-selection signal;
   means responsive to said video signal for addressing different columns of said switches and display elements with respective modulating pulses of a level between said predetermined threshold level and said predetermined lower level and proportional to the corresponding amplitude of said picture information;

and means responsive to said row-selection signals for selectively addressing different rows of said switches and display elements in order to establish the selected rows as return circuits for said firing pulses and said modulating pulses.

2. An image-display panel as defined in claim 1, in which each of said switches has a current-voltage operating characteristic which is substantially symmetrical with respect to pulses of either polarity.

3. An image-display panel as defined in claim 1, in which said switches are each two-terminal amorphous semiconductor devices.

4. An image-display panel as defined in claim 1, in which the energy-storage component of each light-display element is its capacitance.

5. An image-display panel as defined in claim 1, which includes means for time-duration modulating said light-display elements to energize each cell through its associated switch for a time interval proportional to the amplitude of said video signal.

6. An image-display panel according to claim 1, in which each of said light-display elements comprises a light-emitting diode in series with an associated energy-storage device.

7. An image-display panel as defined in claim 6, in which each of said light-display elements comprises a pair of light-emitting diodes connected back-to-back.

8. An image-display panel as defined in claim 6, in which each of said light-emitting diodes is paralleled by a reversely poled diode rectifier located externally to said matrix.

9. An image-display panel as defined in claim 1, in which one of said addressing means includes at least a pair of series-connected breakdown-type gates, in which means are provided for impressing across said series-connected gates a voltage greater than the firing voltage of either but less than the voltage required to fire both in series, and in which is included a photo-sensitive element coupled across one of said gates and responsive to an incident light pulse for effectively shorting said one gate to enable actuation of the other of said gates by said impressed voltage.

10. An image-display panel as defined in claim 1, in which one of said addressing means includes at least a pair of series-connected breakdown-type gates actuatable together to control delivery of said pulses to said switches, in which means are provided for impressing across said series-connected gates a voltage greater than the firing voltage of either but less than the voltage required to fire both in series, and in which is included means coupled to but one of said gates for actuating that gate and enabling concurrent actuation of the other of said gates by said impressed voltage.

11. An image-display panel as defined in claim 10, which includes a second pair of breakdown-type gates coupled in series across each of said switches and also in series with the first pair and which further includes means coupled to but one of the gates in said second pair for actuating that gate and enabling concurrent actuation of the other of said gates in that pair by the impressed voltage, the impedance effectively presented by said switches and their associated display elements to said gates being small relative to the non-conductive impedance of each gate and being large relative to the conductive impedance of each gate, when the switches are themselves conducting.

12. An image-display panel as defined in claim 11, in which said impressed voltage is unidirectional and in which the combination of a capacitor paralleled by a resistor is included in series with said pairs of gates, the time constant of said capacitor and resistor being substantially greater than the duration of said pulses and substantially smaller than the interval between said pulses.

13. An image-display panel as defined in claim 1, in which said energy-storage components are effectively in circuit with respective resistance components and in which said modulating pulses are unidirectional.

14. An image-display panel as defined in claim 13, which further comprises means for supplying to each of said light-display elements and A–C signal proportional to the amplitude of the modulating pulse previously supplied to such element.

15. An image-display panel as defined in claim 14, in which said firing pulses are unidirectional.

16. An image-display panel as defined in claim 1, in which said addressing means comprise means for charging said energy-storage components sequentially along each of said rows, and later effecting simultaneous discharge of all the energy-storage components in each row.

17. An image-display panel as defined in claim 16, in which said addressing means comprise means for charging the rows of said energy-storage components sequentially over said panel to define a frame, in which said energy-storage components are effectively in circuit with respective resistance components and each resistance component exhibits a time constant greater than the interval of said frame, and which includes means for applying to said switches potentials of a polarity opposite that of the charges impressed on the associated energy-storage components and of a magnitude sufficient to actuate said switches and enable discharge of said energy-storage components.

18. An image-display panel as defined in claim 1, in which said addressing means comprise means for applying to said switches unidirectional modulating pulses to charge said energy-storage components to a level between said predetermined threshold level and said lower level, and means for thereafter applying to said switches an alternating potential having a peak amplitude not exceeding said predetermined threshold level.

19. An image-display panel as defined in claim 1, in which said addressing means include an erase-pulse generator for discharging all of the nergy-storage devices in a selected row, a column-switching pulse system for delivering said firing pulses sequentially to the display elements and switches in the selected row subsequent to the action of said erase-pulse generator, and a row-switching system for sequentially completing said return circuits to select the next successive row subsequent to each action of said column-switching system.

20. An image-display panel as defined in claim 19, in which said addressing means further includes sustain means for applying an alternating signal to the selected row of display elements and switches subsequent to the action of said column-switching pulse system, maintaining the application of said alternating signal to the selected row subsequent to the action of said row-switching system, and terminating said application prior to the next action of said erase-pulse generator upon the selected row.

21. An image-display panel as defined in claim 20, in which said sustain means includes a source of said alternating signal coupled between said row-switching system and said column-switching system.

22. An image-display panel as defined in claim 1, in which said addressing means include a plurality of storage capacitors corresponding individually to the respective columns of display elements and switches, a commutating system for delivering said firing pulses sequentially to respective capacitors in a selected row, a plurality of valves coupled individually between respective capacitors and corresponding columns, a dumping-pulse generator for simultaneously actuating said valves subsequent to the action of said commutating system, an erase-pulse generator for discharging all of said capacitors subsequent to the action of said dumping-pulse generator and for discharging all of said energy-storage components prior to the action of said dumping-pulse generator, and a row-switching system for sequentially completing said return circuits to select the next successive row subsequent to each action of said erase-pulse generator to discharge said capacitors, said addressing means further including sustain means for applying an alternating signal to the selected row subsequent to the discharging of said capacitors by said erase-pulse generator, for maintaining the application of said alternating signal to the selected row subsequent to the action of said row-switching system and for terminating said application prior to the next action of said erase-pulse generator to discharge the display elements in the selected row.

23. A television display panel comprising:
an array of horizontal conductors spaced vertically across said panel;
an array of vertical conductors spaced horizontally across said panel;
a plurality of electrically-activated light-display elements individually associated with respective crossings of said horizontal and vertical conductors, each of said elements including an energy-storage component and displaying light of an intensity proportional to its level of energization;
a plurality of breakdown-type switches individually coupling respective display elements electrically between the respectively associated conductor-pair crossings, each of said switches being responsive to a firing potential exceeding a predetermined threshold level for exhibiting a low impedance and responsive to a potential below a lower limt for exhibiting a high impedance;
means for applying firing pulses exceeding said predetermined threshold level in a programmed sequence to said vertical conductors;
means for supplying a video signal composed of successive lines of picture information together with synchronizing signals;
means responsive to said video signal for applying to said vertical conductors individual modulating pulses proportional to the amplitude of said video signal;
and means responsive to said synchronizing signals for completing a return circuit for said firing pulses and modulating pulses successively through respective horizontal conductors.

24. A method of controlling the activation of a light display unit comprising a light affecting component, a breakdown-type switching component, and an energy storage component, said switching component and said energy storage component appearing effectively in series, said unit being capable of affecting light in proportion to the product of the time and intensity of its energization, comprising:
applying across said display unit a voltage pulse having a magnitude which exceeds a predetermined breakdown threshold level of said switching component so as to cause said switching component to become relatively conductive;
while said switching component is in said relatively conductive state, charging said energy storage component to a voltage level which is related to the intended luminous output of said light display component and which is lower than said threshold level;
causing said switching component to return to its relatively non-conductive state; and
applying across said unit at least one sustaining pulse having a magnitude which when added to said voltage level of said storage component exceeds said predetermined threshold level of said switching component to cause said switching component to break down and to discharge said energy storage component.

25. A method of controlling the activation of a light display unit comprising a light affecting component, a breakdown-type switching component, and an energy storage component, said switching component and said energy storage component appearing effectively in series, said unit being capable of affecting light in proportion to the product of the time and intensity of its energization, comprising:
applying across said unit a composite pulse including a firing pulse component having a magnitude which exceeds a predetermined breakdown threshold level of said switching component so as to cause said switching component to become relatively conductive followed by a charging component having a magnitude lower than said threshold level for charging said energy storage component to a voltage level which is related to the intended luminous output of said light display component;
causing said switching component to return to its relatively non-conductive state; and
applying across said unit at least one sustaining pulse having a magnitude which when added to said voltage level of said storage component exceeds said predetermined threshold level of said switching component to cause said switching component to break down and to discharge said energy storage component.

26. A method of controlling the operation of a video display matrix constituted by rows and columns of addressing conductors at each intersection of which is located a light display unit comprising a light affecting component, a breakdown-type switching component, and an energy storage component, said switching component and said energy storage component appearing effectively in series, said unit being capable of affecting light in proportion to the product of the time and intensity of its energization, comprising:
addressing said intersections in a predetermined addressing sequence and applying at each addressed intersection across said unit a composite pulse including a firing pulse component having a magnitude which exceeds a predetermined breakdown threshold level of said switching component so as to cause said switching component to become relatively conductive followed by a charging component having a magnitude which is lower than said threshold level for charging said energy storage component to a voltage level which is related to the intended luminous output of said light display component;
causing said switching component to return to its relatively non-conductive state; and
applying across said unit at least one sustaining pulse having a magnitude which when added to said voltage level of said storage component exceeds said predetermined threshold level of said switching component to cause said switching component to break down and to discharge said energy storage component.

References Cited
UNITED STATES PATENTS

| | | | |
|---|---|---|---|
| 3,532,813 | 10/1970 | Lechner | 178—7.3 D |
| 3,526,711 | 9/1970 | De Boer | 178—7.3 D |
| 3,388,255 | 6/1968 | May | 178—7.3 D |
| 3,311,781 | 3/1967 | Duinker et al. | 178—7.3 D |
| 3,519,880 | 7/1970 | Yoshiyama et al. | 178—7.3 D |
| 3,538,380 | 11/1970 | Babb | 178—7.3 D |
| 3,627,924 | 12/1971 | Fleming | 178—7.3 D |

RICHARD MURRAY, Primary Examiner